United States Patent
Le Stunff et al.

(10) Patent No.: US 10,262,348 B2
(45) Date of Patent: Apr. 16, 2019

(54) CATALOG QUALITY MANAGEMENT MODEL

(71) Applicant: Microsoft Technology Licensing, LLC, Redmond, WA (US)

(72) Inventors: Cedric Le Stunff, Orsay (FR); Victor Cazin, Paris (FR); Alexandre Coutelier, Meudon (FR); Lucas Munoz, Cergy (FR); Nicolas Rival, Montreuil (FR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 521 days.

(21) Appl. No.: 15/149,187

(22) Filed: May 9, 2016

(65) Prior Publication Data

US 2017/0323357 A1    Nov. 9, 2017

(51) Int. Cl.
| | |
|---|---|
| *G06Q 30/00* | (2012.01) |
| *G06Q 30/06* | (2012.01) |
| *G06F 17/30* | (2006.01) |
| *G06F 11/07* | (2006.01) |
| *G06Q 10/06* | (2012.01) |

(52) U.S. Cl.
CPC ..... *G06Q 30/0603* (2013.01); *G06F 11/0727* (2013.01); *G06F 11/0751* (2013.01); *G06F 17/3053* (2013.01); *G06F 17/30592* (2013.01); *G06F 17/30598* (2013.01); *G06Q 10/0639* (2013.01)

(58) Field of Classification Search
CPC ..................................................... G06Q 30/00
See application file for complete search history.

(56) References Cited

U.S. PATENT DOCUMENTS

| | | |
|---|---|---|
| 5,870,762 A | 2/1999 | Lee |
| 7,146,536 B2 | 12/2006 | Bingham et al. |
| (Continued) | | |

FOREIGN PATENT DOCUMENTS

WO    9718519 A1    5/1997

OTHER PUBLICATIONS

Wynne, Susan et al, "The effect or next-generation catalogs on catalogers and cataloging functions in academic libraries", Cataloging & Classification Quarterly, dated Apr. 5, 2011 (Year: 2011).*

(Continued)

*Primary Examiner* — Mark A Fadok
(74) *Attorney, Agent, or Firm* — Alleman Hall Creasman & Tuttle LLP

(57) ABSTRACT

In one example, a content catalog system may process a bulk set of errors to prioritize those errors that may benefit from manual review by a human error administrator. A catalog quality management sub-system of the content catalog system may receive an error output describing a catalog error for a product aspect of a product in a content catalog from an error detection module. The catalog quality management sub-system may categorize the catalog error by a degree of human interaction with an error fix determined from an error metric in the error output. The catalog quality management sub-system may apply an error fix to the catalog error based on the degree of human interaction.

20 Claims, 14 Drawing Sheets

(56) References Cited

U.S. PATENT DOCUMENTS

| | | | |
|---|---|---|---|
| 7,574,382 B1* | 8/2009 | Hubert | G06Q 10/00 705/26.61 |
| 7,624,173 B2 | 11/2009 | Bary et al. | |
| 7,917,481 B1 | 3/2011 | Kale et al. | |
| 8,015,239 B2* | 9/2011 | Sharma | G06F 11/3688 709/202 |
| 8,135,995 B2 | 3/2012 | Ngai et al. | |
| 8,255,873 B2 | 8/2012 | Lazier et al. | |
| 8,543,862 B2* | 9/2013 | Dilman | G06F 11/0727 707/690 |
| 8,560,300 B2 | 10/2013 | Ferrucci et al. | |
| 8,688,603 B1* | 4/2014 | Kurup | G06N 99/005 706/12 |
| 9,152,502 B2 | 10/2015 | Kalach et al. | |
| 2004/0002994 A1 | 1/2004 | Brill et al. | |
| 2005/0102192 A1 | 5/2005 | Gerrits et al. | |
| 2005/0251409 A1 | 11/2005 | Johnson et al. | |
| 2013/0124532 A1 | 5/2013 | McQuarrie | |
| 2014/0281925 A1 | 9/2014 | Falk et al. | |
| 2016/0156955 A1* | 6/2016 | Israel | G06F 17/30038 725/34 |
| 2017/0286207 A1* | 10/2017 | Campbell | G06F 11/0793 |

OTHER PUBLICATIONS

Chapman, et al., "A Catalogue Quality Audit Tool", In Journal of Library and Information Research, vol. 26, Issue 82, Spring 2002, 15 pages.

"International Search Report and Written Opinion Issued in PCT Application No. PCT/US2017/030480", dated Sep. 5, 2017, 10 Pages.

* cited by examiner

*100*

400

500

| ISSUE ID 810 | | | METRIC 820 | | | FIX 830 | | DETAILS 840 | |
|---|---|---|---|---|---|---|---|---|---|
| PROD 812 | MP 814 | ISSUE TYPE 816 / SUB-ISSUE TYPE 818 | CON 822 | FPI 824 | FNI 826 | OLD VALUE 832 | NEW VALUE 834 | SIZE 842 | LANG 844 |

CATALOG QUALITY MANAGEMENT MODEL

BACKGROUND

A content service may store a content catalog describing the content available via the content service. The content catalog may be hosted at a content store accessible with a user device via a data network. The user device may review the content catalog and place an order for the content at the content store. For digital content, the user device may download the digital content via the data network. Alternately for hard copy content, the content store may process the order and deliver the content to the user via other methods, such as the postal service.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to processing bulk set of errors to prioritize those errors that may benefit from manual review by a human error administrator. A catalog quality management sub-system of the content catalog system may receive an error output describing a catalog error for a product aspect of a product in a content catalog from an error detection module. The catalog quality management sub-system may categorize the catalog error by a degree of human interaction with an error fix determined from an error metric in the error output. The catalog quality management sub-system may apply an error fix to the catalog error based on the degree of human interaction.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 8 illustrates, in a block diagram, one example of an error output.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a catalog quality management sub-system, a computing device, or a machine-implemented method.

In one example, a content catalog system may process bulk set of errors to prioritize those errors that may benefit from manual review by a human error administrator. A human error administrator is a human tasked with manually reviewing catalog errors. A catalog quality management sub-system of the content catalog system may receive an error output describing a catalog error for a product aspect of a product in a content catalog from an error detection module. A product aspect may be any description of the product in the catalog as well as any content deliverables of the product itself. The catalog quality management sub-system may categorize the catalog error by a degree of human interaction with an error fix determined from an error metric in the error output. The catalog quality management sub-system may apply an error fix to the catalog error based on the degree of human interaction.

A content delivery system may provide content on a fully automated basis from the content storage of the providers to the delivery to the end user. With such a large amount of content available, errors in the content catalog may be inevitable. Further, with such a large set of content, the inevitable errors may be more than humanly possible to review in even the best run systems.

Each content store in a content catalog system may have an error detection module producing an error output describing a catalog error in a standardized format for processing by a catalog quality management sub-system. The catalog quality management sub-system may aggregate the error outputs into an error output report. The catalog quality management sub-system may determine an impact state for the error outputs based on confidence in the identification of an error and the impact of fixing or not fixing the error. The catalog quality management sub-system may use the impact state to determine whether to automatically fix the catalog error and whether to request a human error administrator to manually review the catalog error and the fix. The catalog quality management sub-system may determine an importance of the catalog product affected by the error. The catalog quality management sub-system may provide an error review list organized based on product importance and impact state to the human error administrator.

Figure 1:
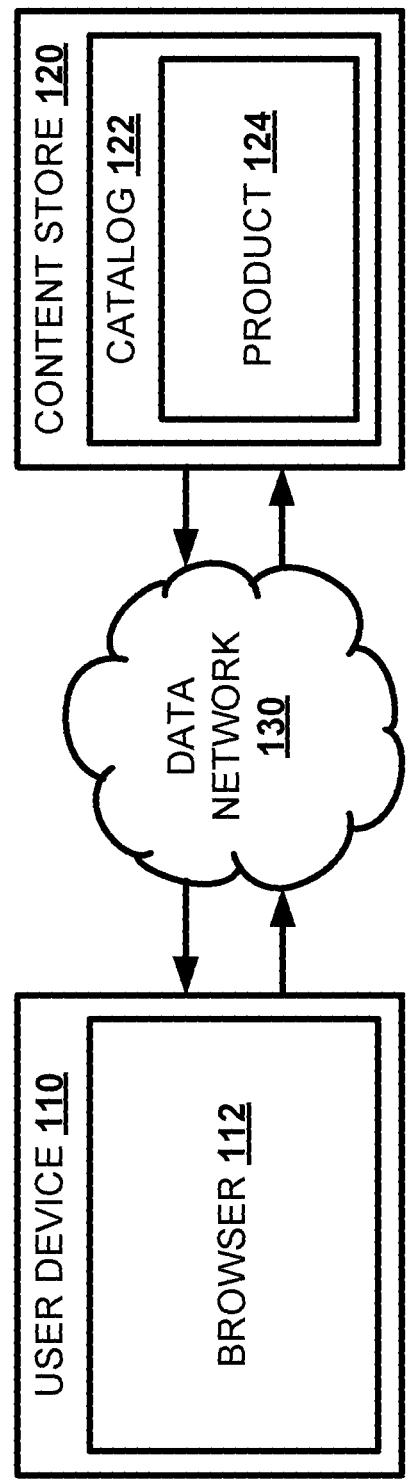
FIG. 1 illustrates, in a block diagram, one example of a content network.

FIG. 1 illustrates, in a block diagram, one example of a content network 100. A user may use a user device 110 that executes a browser 112 to access a content store 120 via a data network connection 130. The user device 110 may be a desktop computer, a laptop computer, a tablet, a smart phone, or a dedicated digital audio player. The data network connection 130 may be an internet connection, a wide area network connection, a local area network connection, or other type of data network connections.

The content store 120 may be a sales portal for content, such as audio files, video files, e-books, or other media. The user device 110 may directly download any purchased content or process sales requests and arrange for later delivery of content. The content store 120 may be implemented on a single server or a distributed set of servers, such as a server farm. The content store 122 may store a catalog 122 for transmission to the user device. The catalog 122 may list a description of one or more products 124 available to the user device. The catalog 122 may also detail a procedure for purchasing those products 124, as well as describing any applicable sales terms.

Figure 2:
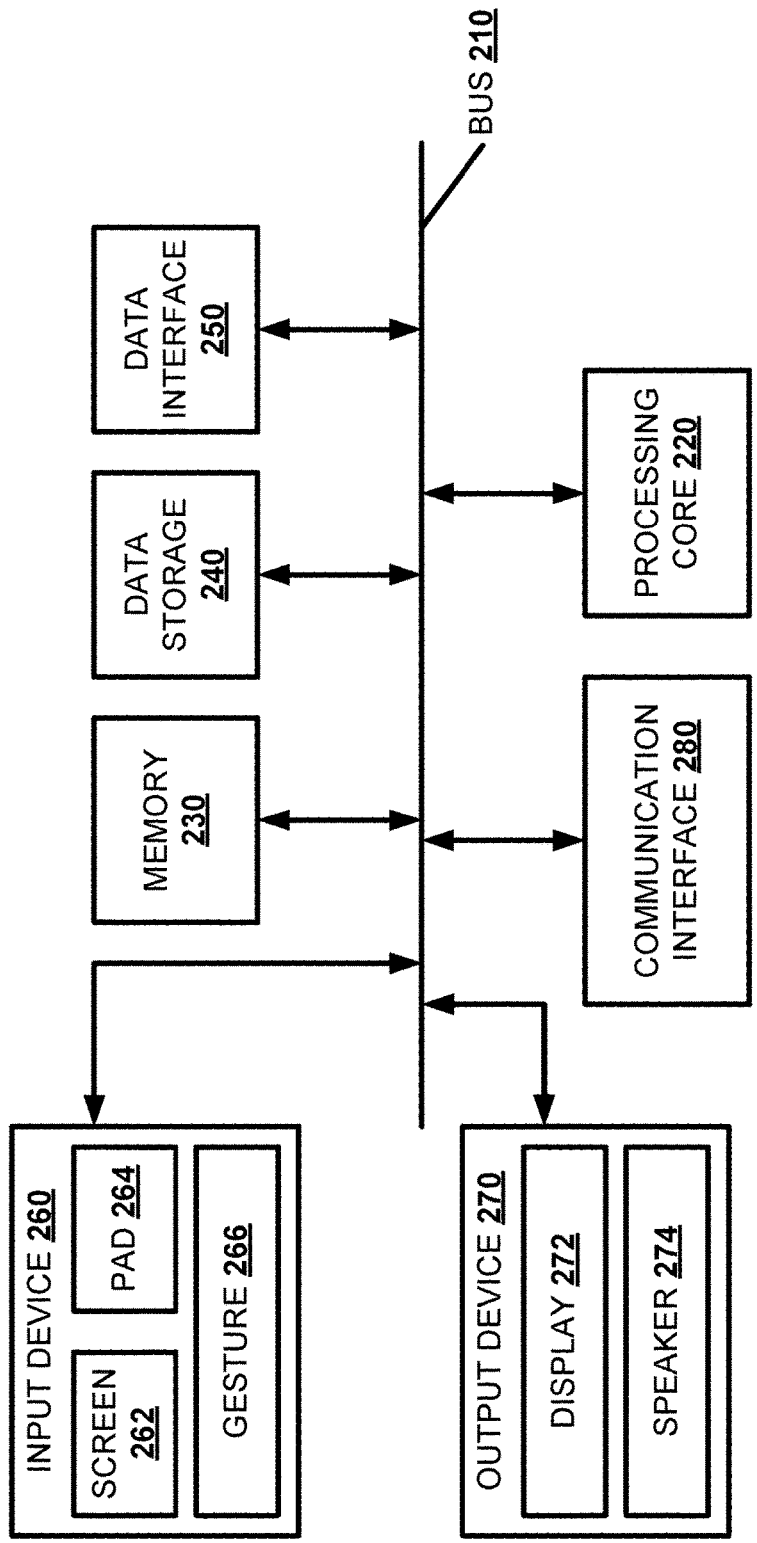
FIG. 2 illustrates, in a block diagram, one example of a computing device.

FIG. 2 illustrates a block diagram of an exemplary computing device 200 which may act as a content catalog system. The computing device 200 may combine one or more of hardware, software, firmware, and system-on-a-chip technology to implement a content catalog system. The computing device 200 may include a bus 210, a processing core 220, a memory 230, a data storage 240, a data interface 250, an input device 260, an output device 270, and a communication interface 280. The bus 210, or other component interconnection, may permit communication among the components of the computing device 200.

The processing core 220 may include at least one conventional processor or microprocessor that interprets and executes a set of instructions. The processing core 220 may be configured to implement a series of instructions for a catalog quality management sub-system. The processing core 220 may be configured to categorize the catalog error by a degree of human interaction with an error fix determined from an error metric in the error output. The error output may have a confidence score describing a likelihood the catalog error is accurately identified. The error output may have at least one of a false positive impact score describing a false identification impact and a false negative impact score describing an impact of ignoring an accurate identification. The processing core 220 may be configured to compute an impact state based on at least one of a false positive impact score, a false negative impact score, and a confidence score. The processing core 220 may be configured to apply an error fix to the catalog error based on the degree of human interaction. The processing core 220 may be configured to compute a product importance score for the product based on at least one of a rating metric describing a product quality of the product and a traffic metric describing consumption of the product. The processing core 220 may be configured to compute an error priority of a catalog error based on a product importance score for the product and an impact state for the catalog error. The processing core 220 may be configured to rank the catalog error in an error review list based on an error priority score. The processing core 220 may be configured to roll back the error fix based on a rejection by a human error administrator.

The memory 230 may be a random access memory (RAM) or another type of dynamic data storage that stores information and instructions for execution by the processing core 220. The memory 230 may also store temporary variables or other intermediate information used during execution of instructions by the processing core 220. The memory 230 may be configured to store a series of instructions that are executed by at least one processor to implement a catalog quality management sub-system. The memory 230 may be configured to store an error log recording the catalog error.

The data storage 240 may include a conventional ROM device or another type of static data storage that stores static information and instructions for the processor 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing an error log.

The data interface 250 may be a hardware, software, or firmware interface designed to interact with an error detection module at a content store. The data interface 250 may be configured to receive an error output describing a catalog error for a product aspect of a product in a content catalog from an error detection module. The data interface 250 may be configured to add the catalog error to a reporting exclusion list to prevent future reporting of the catalog error to a human error administrator.

The input device 260 may include one or more conventional mechanisms that permit a user to input information to the computing device 200, such as a keyboard, a mouse, a voice recognition device, a microphone, a headset, a touch screen 262, a touch pad 264, a gesture recognition device 266, etc. The output device 270 may include one or more conventional mechanisms that output information to the user, including a display screen 272, a printer, one or more speakers 274, a headset, a vibrator, or a medium, such as a memory, or a magnetic or optical disk and a corresponding disk drive.

The communication interface 280 may include any transceiver-like mechanism that enables computing device 200 to communicate with other devices or networks. The communication interface 280 may include a network interface or a transceiver interface. The communication interface 280 may be a wireless, wired, or optical interface. The communication interface 280 may be configured to receive a rating metric describing a product quality of the product from an external review source. The communication interface 280 may be configured to request a post-fix manual review of the error fix by a human error administrator. The communication interface 280 may be configured to request a pre-fix manual review of the error fix by a human error administrator.

The computing device 200 may perform such functions in response to processor 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 280.

Figure 3:
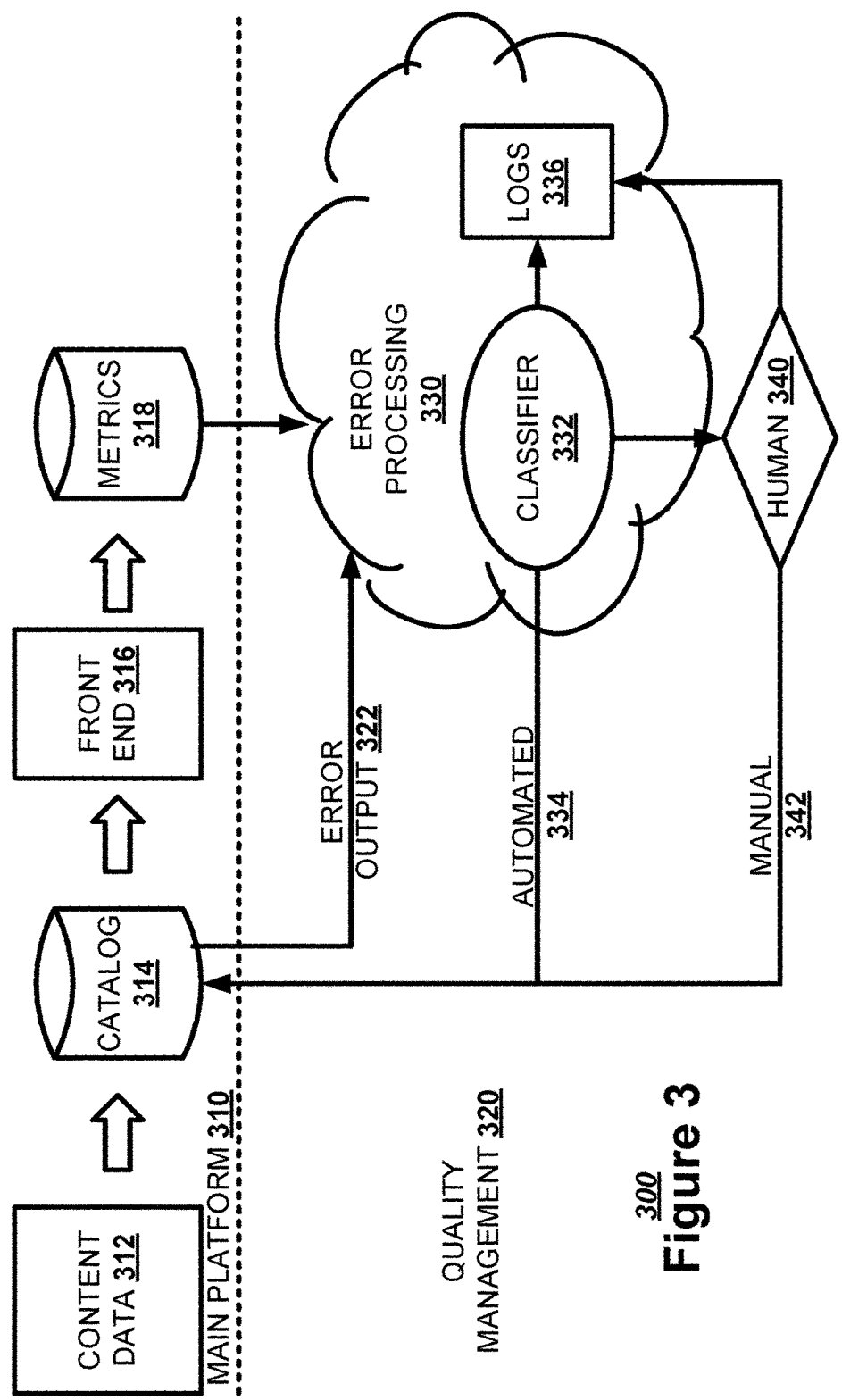
FIG. 3 illustrates, in a block diagram, one example of a content catalog system.

FIG. 3 illustrates, in a block diagram, one example of a content catalog system 300. The content catalog system 300 may have a main platform 310 that organizes a set of content data 312 as input into a content catalog 314 describing products placing the content into merchandisable form. The content data 312 may include content identifiers, metadata describing the content, media files representing the content, availability description of the content, stock keeping units uniquely identifying the products, and other data. The main platform 310 may present the content catalog 314 to a user via a front end module 316. The front end module 316 may collect a set of user metrics describing user interactions with the content catalog 314 in a user metrics database 318. The user metrics may include usage facts, clicks on catalog products, product consumption, and other user interaction descriptions.

The content catalog system 300 may have a catalog quality management sub-system 320. The content catalog 314 may provide an error output 322 identifying an error in a product aspect of the content catalog 314 to the error processing module 330. A product aspect may be any description of the product in the catalog as well as any content deliverables of the product itself. The catalog quality management sub-system 320 may have an error processing module 330 to correct the error identified in the error output 322. The error processing module 330 may have an error issue classifier 332 that factors user metrics from the user metrics database 318 to determine the degree of human interaction to use in fixing the error. The error issue classifier 332 may apply an automated fix 334 to the error identified in the error output 322. The error processing module 330 may update the content catalog 314 with the automated fix 334. The error issue classifier 332 may create an error log 336 describing the error and the automated fix 334.

The error issue classifier 332 may determine that a human error administrator 340 is to review the error output 322. The error issue classifier 332 may provide an error review list describing one or more catalog errors to the human error administrator 340. The error issue classifier 332 may prioritize the catalog errors in the error review list to emphasize certain catalog errors to the human error administrator 340. The human error administrator 340 may apply a manual fix 342 to the catalog error. The human error administrator 340 may update the content catalog 314 with the manual fix 342. The human error administrator 340 may create an error log 336 describing the error and the manual fix 342.

Figure 4:
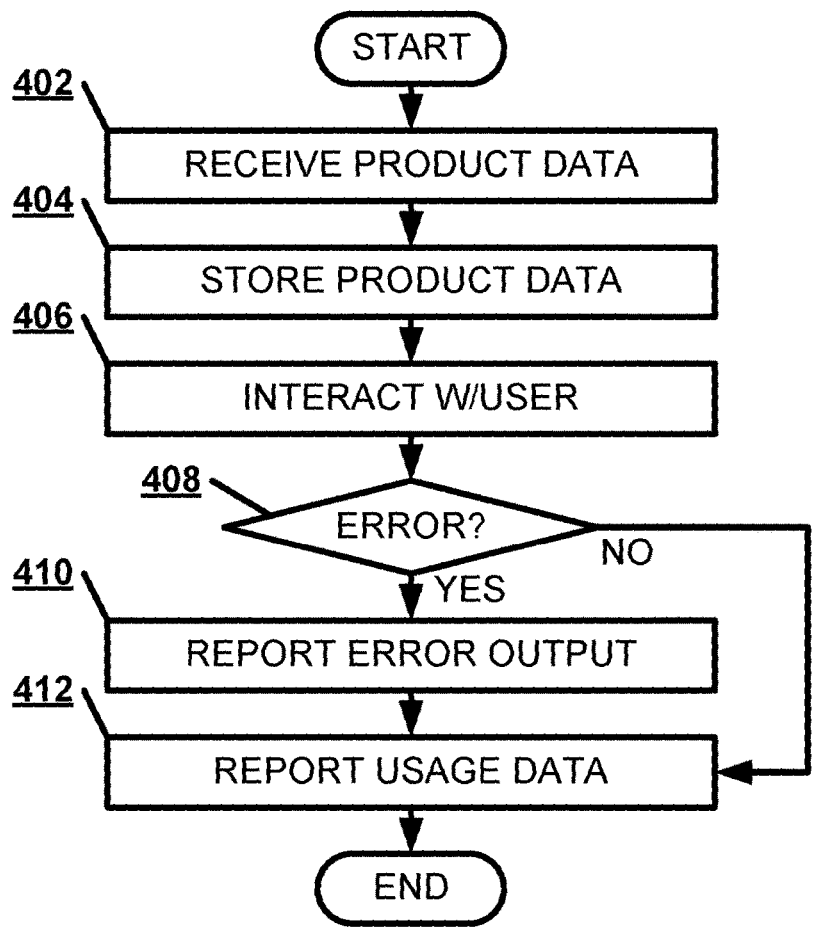
FIG. 4 illustrates, in a flowchart, one example of a method for identifying errors at the main platform of a content catalog system.

FIG. 4 illustrates, in a flowchart, one example of a method 400 for identifying errors at the main platform of a content catalog system. The content catalog system may receive a set of raw product data as an input (Block 402). The content catalog system may store the product data in a content catalog for presentation to a user (Block 404). The content catalog may interact with a user via a front end module (Block 406). If an error detection module detects a catalog error for a product in the content catalog (Block 408), the error detection module may provide an error output describing a catalog error for a product aspect in a content catalog from an error detection module (Block 410). The front end module may report a set of usage data describing user interactions, such as a rating metric describing a user review of the product and a traffic metric describing consumption of the product (Block 412).

Figure 5:
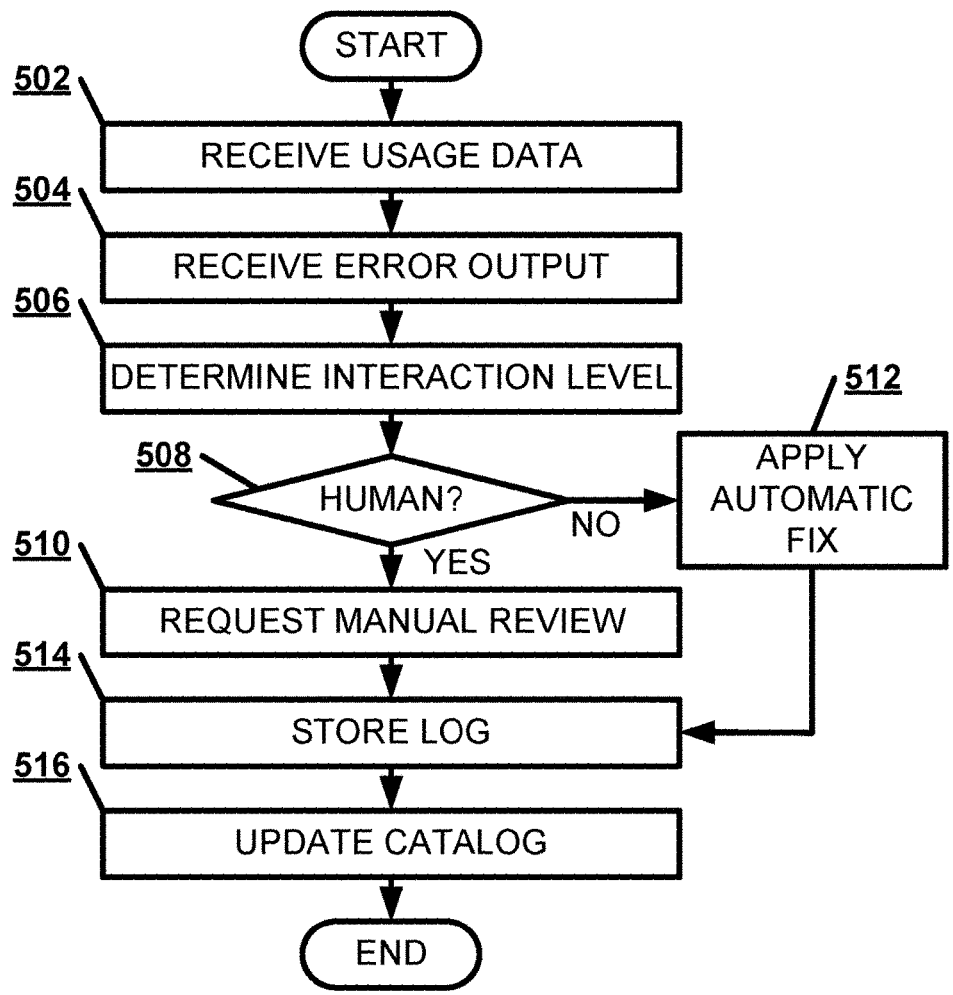
FIG. 5 illustrates, in a flowchart, one example of a method for processing errors at the catalog quality management system of a content catalog system.

FIG. 5 illustrates, in a flowchart, one example of a method 500 for processing errors at the catalog quality management system of a content catalog system. An error processing module may receive a set of usage data describing user interactions, such as a rating metric describing a user review of the product and a traffic metric describing consumption of the product (Block 502). The error processing module may receive an error output describing a catalog error for a product aspect of a product in a content catalog from an error detection module (Block 504). The error processing module may determine a degree of human interaction with an error fix from an error metric in the error output (Block 506). If the error processing module determines that a human error administrator is to review the error fix for the catalog error (Block 508), the error processing module may request a manual review of the error fix by the human error administrator (Block 510). Otherwise, the error processing module may apply an automatic error fix to the catalog error based on the degree of human interaction (Block 512). The error processing module may store an error log recording the catalog error as well as the error fix (Block 514). The error processing module may update the content catalog with the error fix (Block 516).

Figure 6:
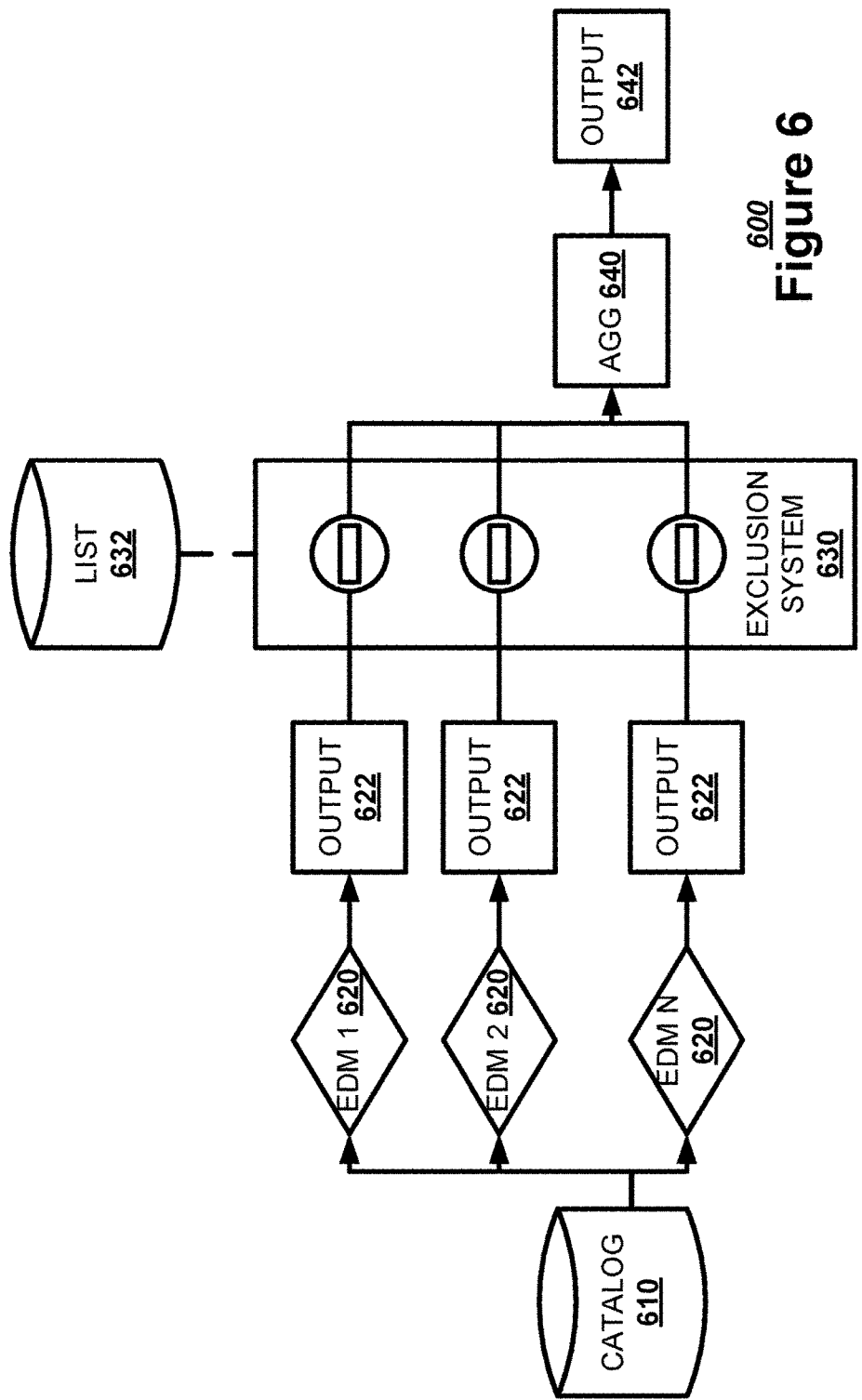
FIG. 6 illustrates, in a block diagram, one example of an error detection system.

FIG. 6 illustrates, in a block diagram, one example of an error detection system 600. Each content catalog 610 may have one or more error detection modules (EDM) 620. An error detection module 620 may collect a list of issues impacting the content catalog 610. The error detection module 620 may review the content catalog 610 for error patterns. The error detection module 620 may execute detection via empirical checks using hardcoded rules of detection or machine learning algorithms, such as language detection or outlier detection. Integrated into a big data solution, an error detection module 620 may perform checks that allow for comparing a vast amount of products to each other to look for near-duplicates or imitations.

Each error detection module 620 may produce a standardized individual error output 622. The error detection module 620 may suggest an automatic fix for the catalog error described in the individual error output 622, such as correcting title misspellings and placing malware infected files in quarantine. An exclusion system 630 may compare each individual error output 622 to an exclusion list 632, removing any individual error output 622 identifying an issue that has already been addressed. An aggregator (AGG) 640 may aggregate the individual error outputs 622 into an aggregated error output report 642. By standardizing the aggregated error outputs 642, an error processing system may compare and rank each individual error output 622 to prioritize catalog errors for manual fixes and manual reviews.

Figure 7:
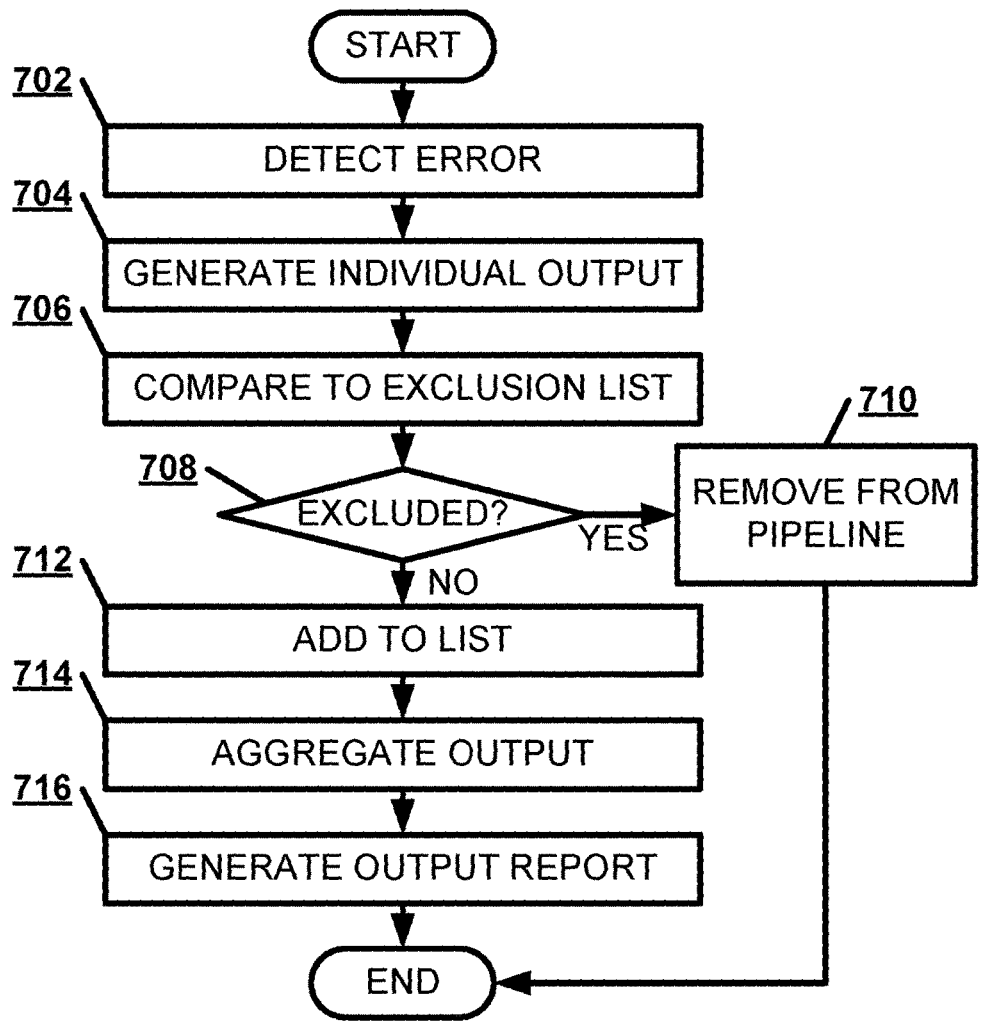
FIG. 7 illustrates, in a flowchart, one example of a method for identifying errors with an error detection system.

FIG. 7 illustrates, in a flowchart, one example of a method 700 for identifying errors with an error detection system. An error detection module may detect a catalog error for a product aspect in a content catalog (Block 702). The error detection module may generate an individual error output describing the catalog error (Block 704). The exclusion system may compare the individual error output to an exclusion list (Block 706). If the individual error output matches a catalog error on the exclusion list indicating the catalog error has been addressed (Block 708), the exclusion system may remove the individual error output from the error collection pipeline (Block 710). Otherwise, the exclusion system may add the catalog error described in the individual error output to the exclusion list (Block 712). An aggregator may aggregate the individual error outputs (Block 714). The aggregator may generate an aggregated error output report (Block 716).

FIG. 8 illustrates, in a block diagram, one example of an error output 800. The error output 800 may have data in at least one an issue identifier category 810, an error metric category 820, a fix identifier category 830, a detail field category 840, and other data categories. An issue identifier category 810 may include an identifier used to uniquely identify the issue. The issue identifier category 810 may have a product identifier 812 indicating the product affected by the catalog error. The issue identifier category 810 may have a marketplace identifier 814 that identifies where the product is being sold. The issue identifier category 810 may have an issue type field 816 describing a product aspect affected by the catalog error, such as the product title, product description, product deliverable, price, and other product features. The issue identifier category 810 may have a sub-issue type field 818 describing the catalog error, such as a typo, wrong description language, misquoted price, failure to apply a restriction, or other error issues.

An error metric category 820 may include error metrics used to classify an error and compute the priority of the error issue. An error metric may measure the importance of an error issue and assess the risk of an automatic fix. The error metric category may include a confidence score 822, a false positive impact (FPI) score 824, a false negative impact (FNI) score 826, or other error metrics. A confidence score 822 is a computed estimate score of the likelihood that the detection is a true positive. A high score may mean that the error detection module has high confidence that the detection is correct. A low score may mean the error detection module has low confidence that the detection is correct. A false positive impact score 824 is a computed or hardcoded score to evaluate the impact of applying an automatic fix when the detection is in error. A false negative impact score 826 is a computed or hardcoded score to evaluate the impact of not applying an automatic fix or a manual fix when the detection is accurate. For an image quality error, the error detection module may compute the false negative impact score 826 by comparing the difference of the current image quality score and a minimum quality score.

A fix identifier category 830 may include an identifier used to describe a suggested fix for the catalog error when possible. The fix identifier category 830 may have an old value field 832 describing the original uncorrected value for the product aspect affected by the catalog error. The fix identifier category 830 may have a new value field 834 describing the corrected value for the product aspect affected by the catalog error after the fix has been applied. For example, for a title error wherein the title of the song "Purple Rain" is listed as "Pupil Rain", the old value field 832 may list "Pupil Rain" and the new value field 834 may list "Purple Rain".

A detail field category 840 may describe various information to facilitate understanding of an issue during manual review. The detail field category 840 may have a size field 842 describing the size of the product aspect affected by the error, such as a title length or file size in bytes. The detail field category 840 may have a language (LANG) field 844 describing the language of the product aspect, such as identifying the language for the title of the song "Raspberry Beret" as English.

Figure 9:
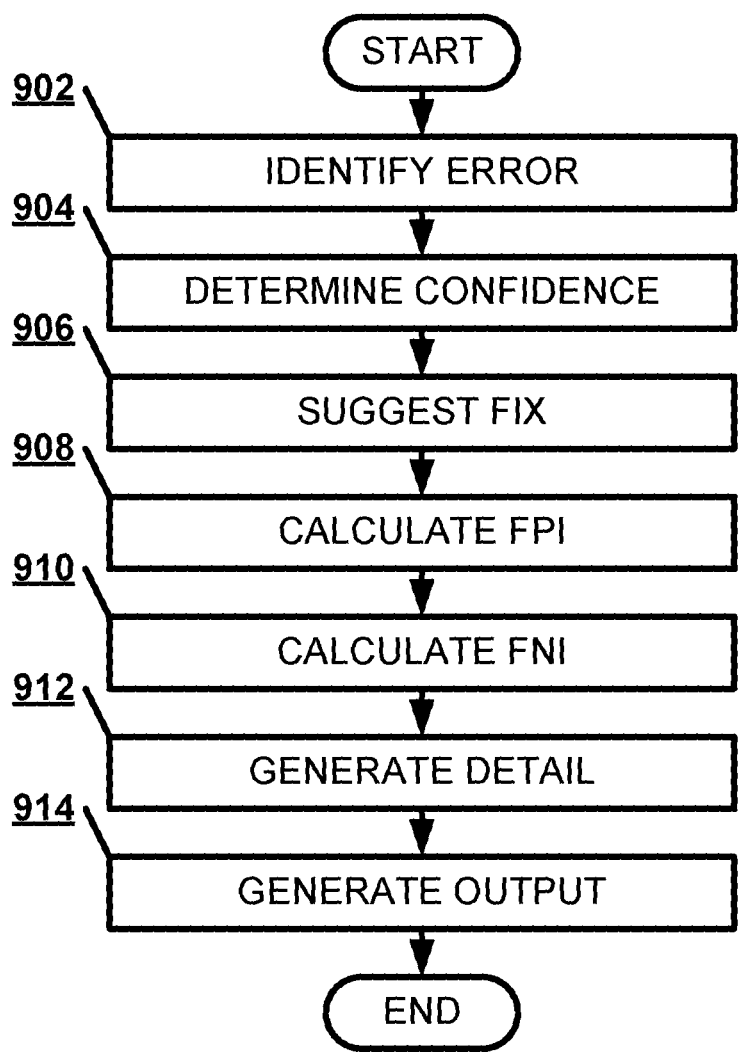
FIG. 9 illustrates, in a flowchart, one example of a method for identifying errors with an error detection module.

FIG. 9 illustrates, in a flowchart, one example of a method 900 for identifying errors with an error detection module. The error detection module may identify a catalog error for a product aspect of a product in a content catalog (Block 902). The error detection module may determine a confidence score describing a likelihood the catalog error is accurately identified (Block 904). The error detection module may suggest at least one of an automatic fix or a manual fix for the catalog error (Block 906). The error detection module may calculate a false positive impact score describing a false identification impact (Block 908). The error detection module may calculate a false negative impact score describing an impact of ignoring an accurate identification (Block 910). The error detection module may generate a detail description describing a product aspect affected by the catalog error (Block 912). The error detection module may generate an individual error output for aggregation (Block 914).

Figure 10:
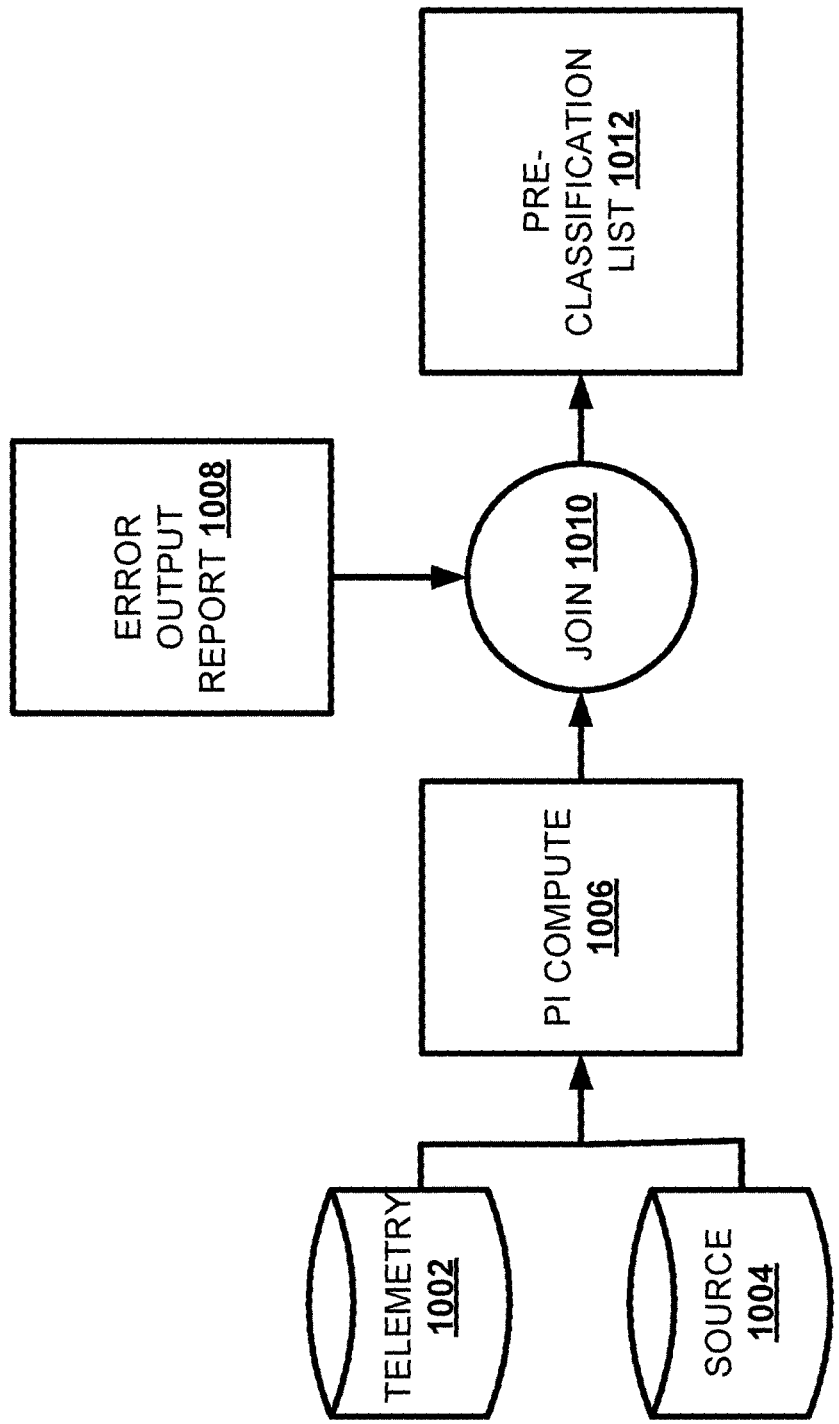
FIG. 10 illustrates, in a block diagram, one example of a product importance module.

FIG. 10 illustrates, in a block diagram, one example of a product importance module 1000. The product importance module 1000 may calculate a product importance score using a variety of metrics. The product importance module 1000 may access an internal telemetry data set 1002 generated within the content catalog system. The internal telemetry data set 1002 may have one or more rating metrics describing product quality, such as a user rating, product novelty, and other product reviews. The internal telemetry data set may have one or more traffic metrics describing consumption of the products, such as number of page views, number of purchases, predicted future views, and other interactive metrics. Further, the product importance module 1000 may receive one or more rating metrics describing a product quality of the product from an external review source 1004, such as partner data and expert reviews.

A product importance (PI) computational module 1006 may combine the various metrics from the internal telemetry data set 1002 and the external review source 1004 to calculate a product importance score. The product importance computational module 1006 may compute the product importance score using the following formula:

$$PI = \Sigma_{i=1}^{N} a_i s_i,$$

where N is the number of metric sub-scores, $s_i$ is the sub-score for the metric, and $a_i$ is a sub-score coefficient parameter. The product importance computational model 1006 may use the sub-score coefficient parameter to weight one metric sub-score in comparison to a different metric sub-score. For example, the product importance computational module may value one purchase more than fifty page views.

Further, the metric sub-score $s_i$ may be dependent on whether the metric is a traffic metric or a rating metric. The product importance computational module 1006 may calculate a traffic metric sub-score using the following formula:

$$s_{(i|traffic)} = \Sigma_{j=1}^{n} \exp^{-\beta_j T_j},$$

where n is the number of traffic events related to the product considered, $T_j$ is the number of days ago the traffic event occurred on the product, and $\beta_j$ is the decay coefficient. The product importance computational module 1006 may apply the decay coefficient to give greater weight to more recent traffic events over older traffic events. The product importance computational module 1006 may calculate a rating metric sub-score using the following formula:

$$s_{(i|rating)} = \frac{r - \frac{r_{max}}{2}}{r_{max}},$$

where r is the rating of the product and $r_{max}$ is the maximum possible rating.

The product importance module 1000 may combine the product importance score with an error output report 1008 aggregated from error detection system using a joining module 1010 to generate a pre-classification list 1012. The pre-classification list 1012 may have separate fields describing the error output affecting a product aspect and the product importance score for that product. The product importance module 1000 may then provide the pre-classification list 1012 to an error classification module.

Figure 11:
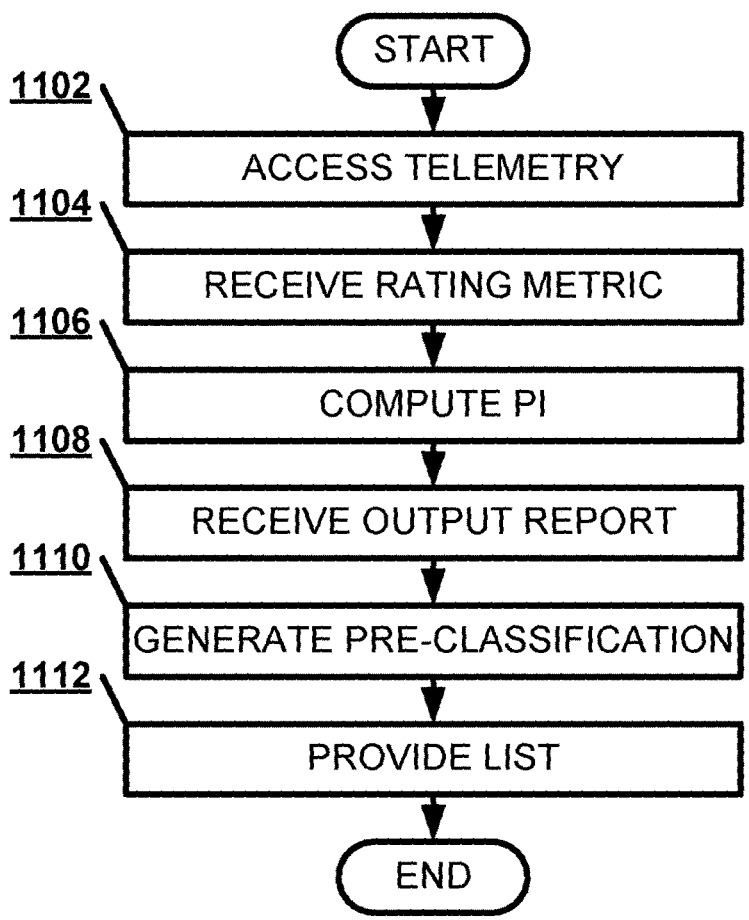
FIG. 11 illustrates, in a flowchart, one example of a method for determining a product importance.

FIG. 11 illustrates, in a flowchart, one example of a method 1100 for determining a product importance score. The product importance module may access an internal telemetry data set generated within the content catalog system (Block 1102). The product importance module may receive a rating metric describing a product quality of the product from an external review source (Block 1104). The product importance module may compute a product importance for the product based on at least one of a rating metric describing a product quality of the product and a traffic metric describing consumption of the product (Block 1106). The product importance module may receive an error output report aggregated from a set of error detection modules (Block 1108). The product importance module may join the product importance scores to an error output report to generate a pre-classification list (Block 1110). The product importance module may provide the pre-classification list to the error classification module (Block 1112).

Figure 12:
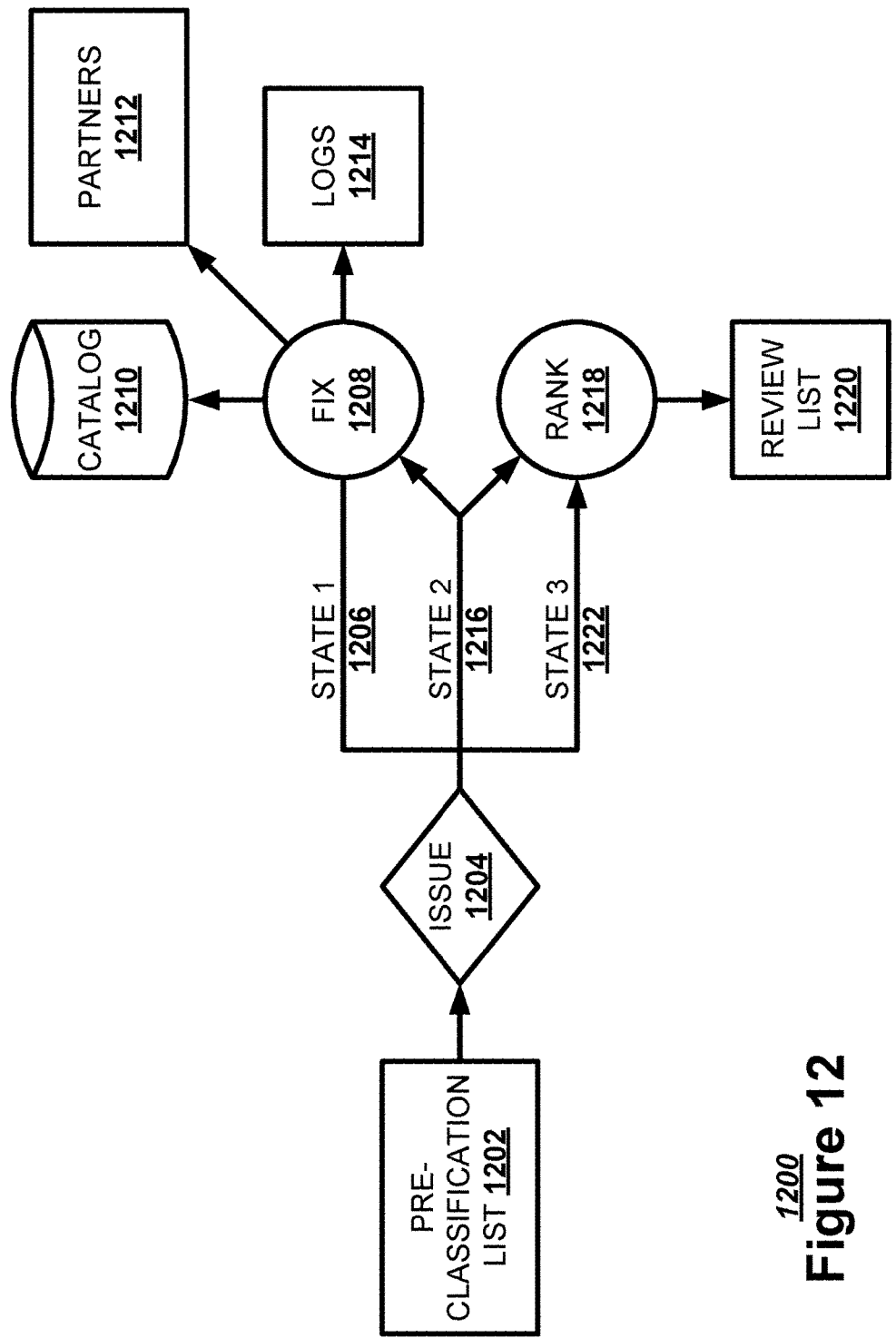
FIG. 12 illustrates, in a block diagram, one example of an error classification module.

FIG. 12 illustrates, in a block diagram, one example of an error classification module 1200. The error classification module 1200 may feed the pre-classification list 1202 to an issue classifier 1204. The issue classifier 1204 may classify a catalog error into one of multiple impact states. In state one ($s_1$) 1206, the error classification module 1200 may apply an automatic fix 1208 to the catalog error, updating the content catalog 1210. The error classification module 1200 may notify any external partners 1212 associated with the affected product. The error classification module 1200 may generate and store an error log 1214 recording the catalog error. The error log 1214 may record the error output, the old value of the affect product aspect, the new value of the fixed product aspect, the date the automatic fix 1208 was applied, and the state of the catalog error.

In state two ($s_2$) 1216, the error classification module 1200 may apply an automatic fix 1208 to the catalog error, updating the content catalog 1210. The error classification module 1200 may notify any external partners 1212 associated with the affected product. The error classification module 1200 may generate and store an error log 1214 recording the catalog error. Additionally, the error classification module 1200 may apply a ranker 1218 to compute the priority of the catalog error. The ranker 1218 generates a review list 1220 with each catalog error ordered based on the priority for examination by a human error administrator. If the human error administrator disapproves of the automatic fix 1208, the error classification module 1200 may roll back the automatic fix 1208 returning the catalog error to an original condition. The error classification module 1200 may update the exclusion list to the remove the catalog error from the system.

In state three ($s_3$) 1222, the error classification module 1200 may apply a ranker 1218 to compute the priority of the catalog error. The ranker 1218 generates a review list 1220 with each catalog error ordered based on the priority for examination by a human error administrator. If the human error administrator approves of the suggested fix, the error classification module 1200 may apply the suggested fix to the catalog error. Otherwise, the error classification module 1200 may update the exclusion list to the remove the catalog error from the system.

The issue classifier 1204 may use the confidence score, the false positive impact score, and the false negative impact score in the pre-classification list 1202 to classify the catalog error. If the confidence score is high, most error detections may be a true positive. By applying the automatic error fix, the error classification module 1200 may invert the error rate. If the confidence score is low, most error detections may be a false positive. The error classification module 1200 may seek a manual check before applying a suggested fix. Any confidence score over fifty percent may reduce the error rate by applying the automatic fixes 1208.

Generally, the issue classifier 1204 may consider the three scores in a variety of combinations. If the confidence score is high and the impact for a mistake is low, represented by a low false positive impact score, the error detection module 1200 may apply an automatic fix, as in state one 1206. If the confidence score is high but the impact for a mistake is high, represented by a high false positive impact score, the error detection module 1200 may apply an automatic fix to invert the error rate but also request a follow up manual check, as in state two 1216. If the confidence score is high, the impact for a mistake is low, and the impact of doing nothing is high, represented by a high false negative impact score, the error detection module 1200 may apply an automatic fix, as in state one 1206. If the confidence score is high, the impact for a mistake is high, and the impact of doing nothing is high, the error detection module 1200 may apply an automatic fix to invert the error rate but also request a follow up manual check, as in state two 1216.

If the confidence score is low and the impact for doing nothing is low, the error detection module 1200 may request a manual check or do nothing, as in state three 1222. If the confidence score is low, the impact for a mistake is low, and the impact for doing nothing is high, the error detection module 1200 may apply an automatic fix to invert the error rate but also request a follow up manual check, as in state two 1216. If the confidence score is low, the impact for a mistake is high, and the impact for doing nothing is high, the error detection module 1200 may request a manual check before acting, as in state three 1222.

In a two state system, the issue classifier 1204 may classify a catalog error as being state one 1206 if the confidence score is greater than fifty percent and the false positive impact score is less than the false negative score. Thus, the error classification module 1200 may apply an automatic fix 1208. Otherwise, the issue classifier 1204 may classify a catalog error as state three 1222, as hybrid state two 1216 does not exist in this scenario. The error classification module may include the catalog error in the prioritized review list 1220 for presentation to a human error administrator for manual review.

In a three state system, the issue classifier 1204 may classify a catalog error as being state one 1206 if the confidence score is greater than eighty percent, the false positive impact score is less than twenty percent, and the false negative score is greater than eighty percent. Thus, the error classification module 1200 may apply an automatic fix 1208. Otherwise, the issue classifier 1204 may classify the catalog error as state two 1216 if the confidence score is greater than fifty percent, the false positive impact score is less than forty percent, and the false negative score is greater than sixty percent. Thus, the error classification module 1200 may apply an automatic fix 1208 and include the catalog error in the prioritized review list 1220 for presentation to a human error administrator for manual review. Otherwise, the issue classifier 1204 may classify a catalog error as state three 1222. The error classification module

1200 may include the catalog error in the prioritized review list 1220 for presentation to a human error administrator for manual review.

The ranker 1218 may compute a priority score for issues classified as state two 1216 or state three 1222. A high priority score may indicate that the catalog error is significant and may be ranked higher for earlier review. If the state is state three 1222, the error classification module 1200 may decide whether to apply the fix. The ranker 1218 may use the false negative impact score coupled with the confidence score and the product importance score to prioritize the catalog error. The priority score may equal the product importance score times the confidence score times the false negative impact score. If the state is state two 1216, the error classification module 1200 has applied the fix and the fix may be reviewed manually. The ranker 1218 may use the false positive impact score coupled with the inverse of the confidence score and the product importance score to prioritize the catalog error. The inverse of the confidence score, representing the probability that correcting the catalog error was a mistake, may equal one minus the confidence score. The priority score may equal the product importance score times the inverse confidence score times the false positive impact score.

Figure 13:
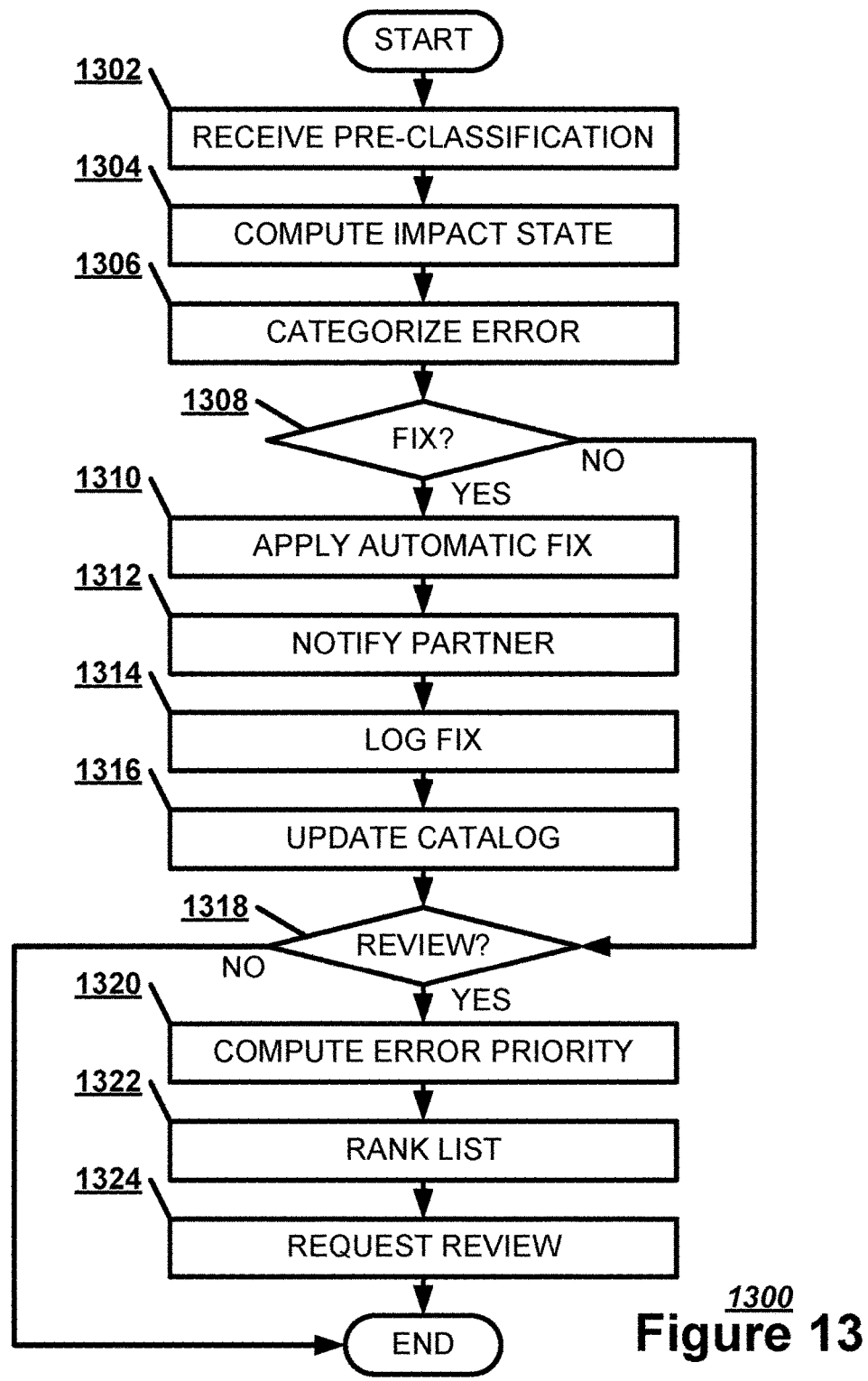
FIG. 13 illustrates, in a flowchart, one example of a method for classifying error issues.

FIG. 13 illustrates, in a flowchart, one example of a method 1300 for classifying error issues. An error classification module may receive a pre-classification list containing an error output and a product importance score (Block 1302). The error output may list a catalog error for a product aspect of a product in a content catalog from an error detection module, a confidence score describing a likelihood the catalog error is accurately identified, a false positive impact score describing a false identification impact, and a false negative impact score describing an impact of ignoring an accurate identification. The error classification module may compute an impact state based on at least one of a false positive impact score, a false negative impact score, and a confidence score (Block 1304). The error classification module may categorize the catalog error by a degree of human interaction with an error fix determined from an error metric in the error output, such as the impact state (Block 1306).

If the catalog error is classified in an impact state incorporating an automatic fix (Block 1308), the error classification module may apply an error fix to the catalog error based on the degree of human interaction (Block 1310). The error classification module may notify an external partner associated with the product that the automatic fix has been applied (Block 1312). The error classification module may store an error log recording the catalog error and the automatic fix (Block 1314). The error classification module may update the content catalog at the content store (Block 1316).

If the catalog error is classified in an impact state incorporating an automatic fix (Block 1308) and a manual review (Block 1318), the error classification module may compute an error priority score of a catalog error based on a product importance score for the product and an impact state for the catalog error (Block 1320). The error classification module may rank the catalog error in an error review list based on an error priority score (Block 1322). The error classification module may request a post-fix manual review of the error fix by a human error administrator (Block 1324).

If the catalog error is classified in an impact state incorporating just a manual review (Block 1318), the error classification module may compute an error priority of a catalog error based on a product importance for the product and an impact state for the catalog error (Block 1320). The error classification module may rank the catalog error in an error review list based on an error priority score (Block 1322). The error classification module may request a pre-fix manual review of the error fix by a human error administrator (Block 1324).

Figure 14:
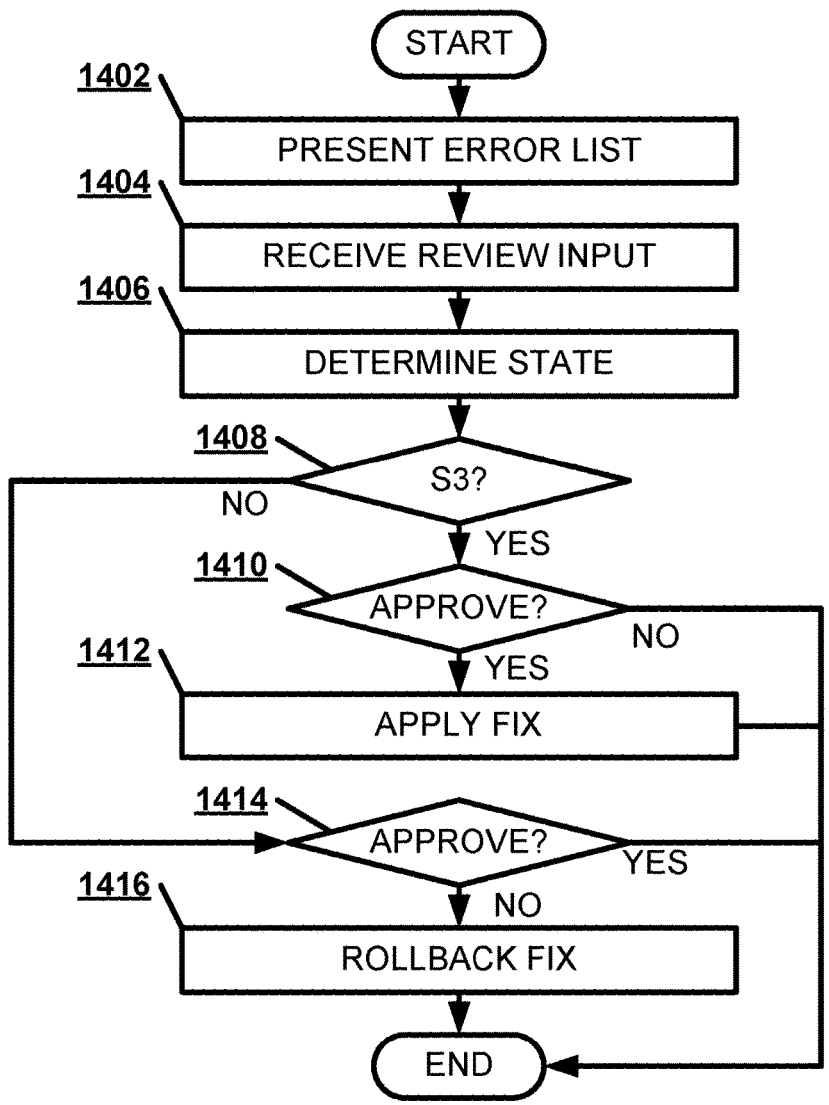
FIG. 14 illustrates, in a flowchart, one example of a method for receiving an error decision from a human error administrator.

FIG. 14 illustrates, in a flowchart, one example of a method 1400 for receiving an error decision from a human error administrator. The error classification module may present the error review list to a human error administrator (Block 1402). The error classification module may receive a review input from the human error administrator indicating a fix approval or disapproval (Block 1404). The error classification module may determine the impact state of the catalog error (Block 1406). If the catalog error has an impact state of state three (Block 1408) and the human error administrator has approved the suggested fix (Block 1410), the error classification module may apply the suggested fix to the catalog error (Block 1412). If the catalog error has an impact state other than state three (Block 1408) and the human error administrator has disapproved the suggested fix (Block 1414), the error classification module may roll back the error fix based on a rejection by a human error administrator (Block 1416).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Examples may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A catalog quality management sub-system, comprising:
    a data interface configured to receive an error output describing a catalog error for a product aspect of a product in a content catalog from an error detection module;
    a processing core having at least one processor configured to categorize the catalog error by a degree of human interaction with an error fix determined from an error metric in the error output and configured to apply an error fix to the catalog error based on the degree of human interaction; and
    memory configured to store an error log recording the catalog error.

2. The catalog quality management sub-system of claim 1, wherein the catalog error is added to a reporting exclusion list to prevent future reporting of the catalog error to a human error administrator.

3. The catalog quality management sub-system of claim 1, wherein the error output has a confidence score describing a likelihood the catalog error is accurately identified.

4. The catalog quality management sub-system of claim 1, wherein the error output has at least one of a false positive impact score describing a false identification impact and a false negative impact score describing an impact of ignoring an accurate identification.

5. The catalog quality management sub-system of claim 1, wherein the processing core is configured to compute an impact state based on at least one of a false positive impact score, a false negative impact score, and a confidence score.

6. The catalog quality management sub-system of claim 1, further comprising:
    a communication interface is configured to receive a rating metric describing a product quality of the product from an external review source.

7. The catalog quality management sub-system of claim 1, wherein the processing core is configured to compute a product importance score for the product based on at least one of a rating metric describing a product quality of the product and a traffic metric describing consumption of the product.

8. The catalog quality management sub-system of claim 1, wherein the processing core is configured to compute an error priority of a catalog error based on a product importance score for the product and an impact state for the catalog error.

9. The catalog quality management sub-system of claim 1, wherein the processing core is configured to rank the catalog error in an error review list based on an error priority score.

10. The catalog quality management sub-system of claim 1, further comprising:
    a communication interface is configured to request a post-fix manual review of the error fix by a human error administrator.

11. The catalog quality management sub-system of claim 1, wherein the processing core is configured to roll back the error fix based on a rejection by a human error administrator.

12. The catalog quality management sub-system of claim 1, further comprising:
    a communication interface is configured to request a pre-fix manual review of the error fix by a human error administrator.

13. A computing device, having a memory to store a series of instructions that are executed by at least one processor to implement a catalog quality management sub-system, the computing device configured to
    receive an error output describing a catalog error for a product aspect of a product in a content catalog from an error detection module;
    compute an impact state based on at least one of a false positive impact score describing a false identification impact, a false negative impact score describing an impact of ignoring an accurate identification, and a confidence score describing a likelihood the catalog error is accurately identified;
    categorize the catalog error by a degree of human interaction with an error fix determined from an impact state; and
    apply an error fix to the catalog error based on the degree of human interaction.

14. The computing device of claim 13, wherein the computing device is further configured to
    receive a rating metric describing a product quality of the product from an external review source.

15. The computing device of claim 13, wherein the computing device is further configured to
    compute a product importance score for the product based on at least one of a rating metric describing a product quality of the product and a traffic metric describing consumption of the product.

16. The computing device of claim 13, wherein the computing device is further configured to
    compute an error priority score of a catalog error based on a product importance score for the product and an impact state for the catalog error.

17. The computing device of claim 13, wherein the computing device is further configured to
    rank the catalog error in an error review list based on an error priority score.

18. The computing device of claim 13, wherein the computing device is further configured to
    roll back the error fix based on a rejection by a human error administrator.

19. A machine-implemented method, comprising:
    receiving an error output describing a catalog error for a product aspect of a product in a content catalog from an error detection module;
    computing an impact state based on at least one of a false positive impact score describing a false identification impact, a false negative impact score describing an impact of ignoring an accurate identification, and a confidence score describing a likelihood the catalog error is accurately identified;
    categorizing the catalog error by a degree of human interaction with an error fix determined from an impact state;

applying an error fix to the catalog error based on the degree of human interaction; and requesting a post-fix manual review of the error fix by a human error administrator.

20. The method of claim 19, further comprising:

computing a product importance score for the product based on at least one of a rating metric describing a product quality of the product and a traffic metric describing consumption of the product;

computing an error priority score of a catalog error based on a product importance score for the product and an impact state for the catalog error; and ranking the catalog error in an error review list based on an error priority score.

* * * * *